United States Patent [19]

Price

[11] Patent Number: 4,751,745
[45] Date of Patent: Jun. 14, 1988

[54] HIGH FREQUENCY SIGNAL FILTER APPARATUS

[75] Inventor: Alistair J. Price, Dallas, Tex.

[73] Assignee: Rockwell International Corporation, Dallas, Tex.

[21] Appl. No.: 919,939

[22] Filed: Oct. 17, 1986

[51] Int. Cl.$^4$ .............................................. H04B 9/00
[52] U.S. Cl. ................................................... 455/619
[58] Field of Search ............... 455/617, 619, 606, 607, 455/307; 330/277, 306; 333/175, 178

[56] References Cited

U.S. PATENT DOCUMENTS 3,657,543  4/1972  Rose ..................................... 455/619
4,295,225  10/1981  Pan ...................................... 330/277

Primary Examiner—Robert L. Griffin
Assistant Examiner—Leslie Van Beek
Attorney, Agent, or Firm—Bruce C. Lutz

[57] ABSTRACT

A noise signal filtering approach, for use in conjunction with high impedance signal sources, which advantageously utilizes parasitic capacitances in the high impedance source in conjunction with an inductance to form a high-Q tuned circuit whose three dB bandwidth is much narrower than the bandwidth of the signal to be processed. By passing this signal, as first filtered, through a multiple zeros of transmission second filter, a resultant signal is obtained which is the equivalent of a matched filter response of the original signal. As is known in the art, a matched filter response of a single burst of signals of a given frequency is the optimal filter usable to maximize signal amplitude and minimize white noise in the signal being processed.

7 Claims, 2 Drawing Sheets

HIGH FREQUENCY SIGNAL FILTER APPARATUS

THE INVENTION

The present invention is concerned generally with signal processing, and more specifically, with processing a signal characterized as a burst of radio frequency or higher frequency signals in a single burst and processing said signal in such a manner as to obtain maximum signal-to-noise ratio outputs. Even more specifically, the present invention is directed toward the detection of an optical signal using photo diode apparatus and circuit techniques.

BACKGROUND

When detecting an optical signal, a typical approach is to use a photo diode. Photo diodes, as an accident of design, incorporate unwanted or parasitic capacitance. The parasitic capacitance produces undesirable effects in the signal detection by lowering the signal amplitude output as a function of increasing frequency. Further, parasitic capacitance is typically found in the signal amplifying stages normally associated with the signal detector. Thus, it is desirable to minimize or eliminate the effects of this parasitic capacitance.

Typical prior art approaches to solving this problem are shown in articles, such as in an article entitled, "Achievement of Nearly Shot Noise Limited Operation in a Heterodyne Type PCM-ASK Optical Communication System", by Kikuchi, et al., at the 8th European Conference on Optical Communications, Sept. 21-24 in 1982, at Cannes, France, where the approach was to add a resistor and an inductor into the circuit. The effect of the inductor is to convert the low-pass nature of the original circuit into a bandpass response at the desired frequency. Such a bandpass response is undesirable in many existing detection circuits other than heterodyne. The resistor in this heterodyne detection approach, broadens the response and accordingly lowers the signal amplitude. Accordingly, more amplification is needed in the later stages before the signal acquires a useful level. The amplification typically involves amplification of noise signals and in the process, typically introduces new noise signals.

A further similar approach was shown in "Electronics Letters", 30 January 1986, on p. 164. In this article, no circuitry was shown, but in view of the discussion that the signal was later bandpass filtered, leads one to believe that the approach is similar to that discussed in the previous 1982 article.

The present invention follows the general teaching of prior art knowledge that it is desirable in attempting to eliminate white noise from a signal of the type comprising a single burst of high frequency signal where the burst has a waveform approximating that of a rectangular wave to pass the signal through a circuit having a matched filter response.

The present invention comprises the realization that such a matched filter response can be obtained by including only an inductor in the signal source circuit, and not a resistor, to produce a high-Q circuit whose three dB bandwidth is much narrower than the bandwidth of signal to be passed or detected. Then, after amplification of the signal to a desirable amplitude, the signal is again filtered in a two path network, or any other filter which exhibits suitable characteristics incorporating at least one transmission zero at the center frequency of the high-Q filter circuit previously used. With appropriate adjustments, this zero of the second filter cancels the pole of the first filter and, in accordance with matched filter theory, a high signal-to-noise ratio is achieved at the output of the second filter. The resulting signal minimizes noise from the signal as initially received.

It is thus an object of the present invention to provide an improved form of signal processing of signals in a high impedance circuit environment having parasitic capacitance and where the signal being processed has relatively large amounts of white noise and thus a low signal-to-noise ratio.

Other objects and advantages of the present invention will be apparent from a reading of the specification and appended claims in conjunction with the drawings wherein FIG. 1 is a combination circuit-block diagram of the prior art; and FIG. 2 is a combination circuit-block diagram of the present inventive concept where both of the figures are drawn for similar end results.

DETAILED DESCRIPTION

Figure 1:
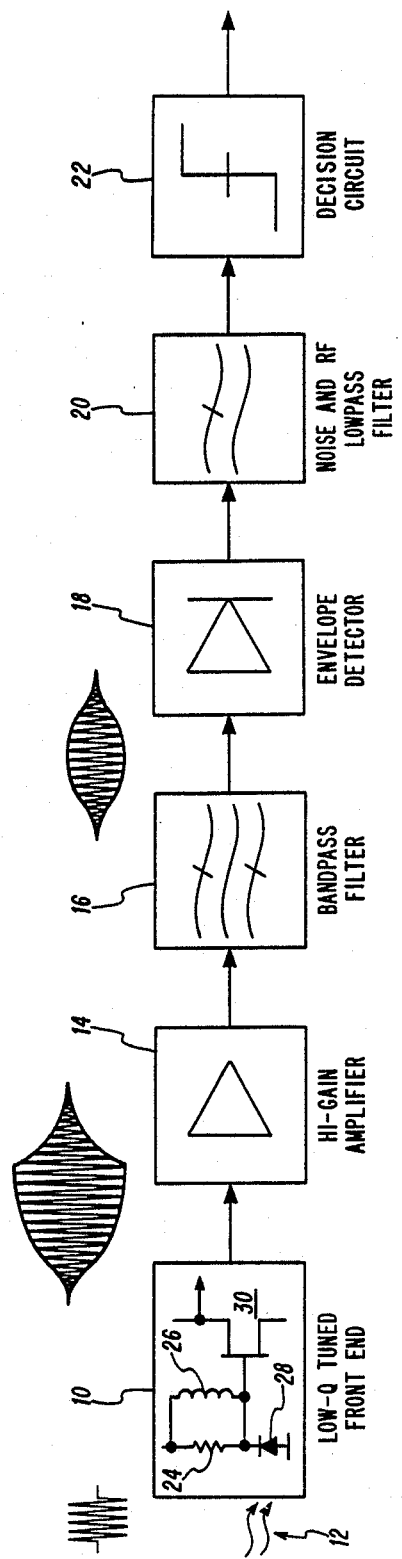

In FIG. 1, a block 10 comprises a low-Q tuned front end or optical detector and amplifier, and is designed for receiving optical signals illustrated by the curved arrows 12. Block 10 supplies detected signals to an amplifier block 14 which passes the signals to a bandpass filter 16. An output of bandpass filter 16 is supplied to an envelope detector 18 and from there through a noise and RF low-pass filter 20 to a decision circuit 22. The form of the current signals in the optical detector 28 in block 10 comprises bursts of high frequency signals, each having a substantially rectangular waveform as shown immediately to the left and above block 10. The waveform of the signals, after passing through the low-Q circuit, are shown in the area above and between blocks 10 and 14. The general waveshape of the detected signals, after being passed through bandpass filter 16, are shown above and between blocks 16 and 18. Within block 10 is illustrated a resistor 24, an inductor 26, a photo diode 28 and an FET generally designated as 30.

Figure 2:
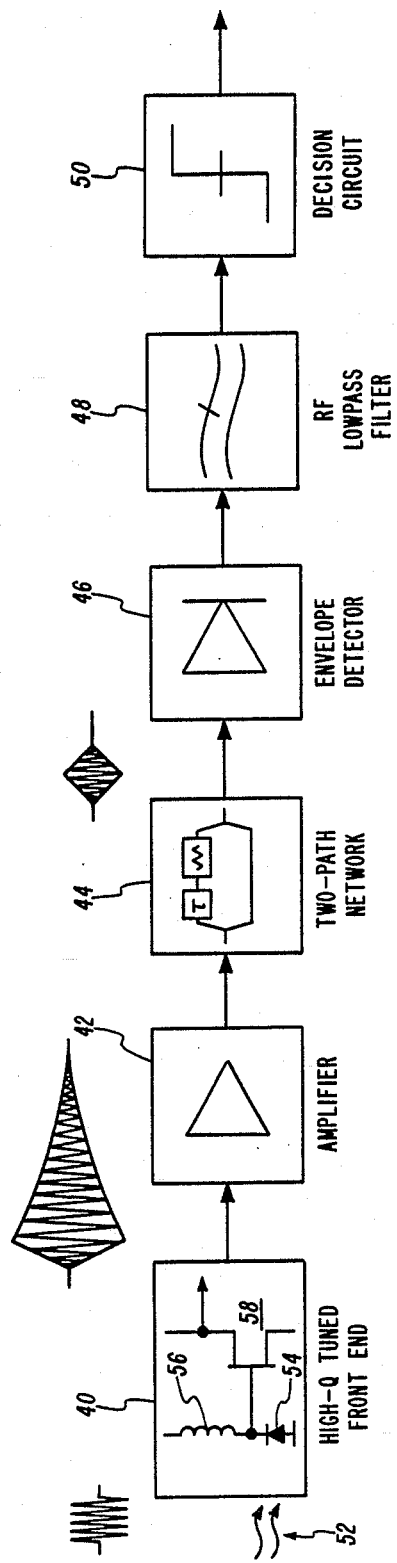

In FIG. 2, a high-Q tuned circuit block 40 is shown supplying signals to an amplifier 42, which continues the transmission of signals to a two path network or other suitable filter 44. The output of network 44 is supplied to an envelope detector 46. After the signal is passed through envelope detector 46, it is passed through an RF low-pass filter 48 and output to a decision circuit 50. Although the amplifier 42 is similar to that of 14 in FIG. 1, it does not need to be as high gain an amplifier as that illustrated in 14, since the high-Q circuit of 40 provides a higher amplitude version of the detected signal than it does the low-Q circuit 10 of FIG. 1. Blocks 42, 46, 48 and 50 are similar in many respects to their comparable blocks in FIG. 1. The optical signal being detected by block 40 is illustrated by the arrows 52 and the current waveform in the optical detector 54 is shown to the left and above block 40. This signal input is comparable to that shown in FIG. 1. Within block 40 is illustrated a diode 54, an inductance 56 and an FET amplifier generally designated as 58. The application of the input signal to 40, and the effect of a high-Q tuned front end on this signal, results in a signal as illustrated between and above blocks 40 and 42. If the Q of the circuit 40 were infinite, there would not be any trailing dip in the amplitude of this signal. However, there is a decay because the Q of block 40 is finite. The matched filter response of a rectangular burst of high frequency signals is a triangular waveform signal as illustrated between blocks 44 and 46. The matched filter theory, as previously explained, decrees that this is the most efficient way to preserve the data of an input signal while minimizing extraneous white noise on that signal. A two path network, as illustrated, was incorporated in a preferred embodiment of the inventive concept, but any other filter which exhibits suitable characteristics may be substituted within block 44.

It should be further noted that, although the application of the inventive concept is applied to a photo diode detector circuit, the concept may be applied to any signal source having a high input impedance and parasitic capacitance, which parasitic capacitance is causing equalization problems in the processing of the signal downstream.

OPERATION

When an optical signal is detected by the diode 54 of FIG. 2, its impedance is lowered such that the voltage at the junction point between inductor 56 and the diode 54 is altered. This change in voltage is transmitted to the FET 58 for further transmission to the amplifier 42. The diode 54, as manufactured, has parasitic capacitance as a result of the proximity of the anode and cathode. The FET 58 typically also has a similar parasitic capacitance due to its construction. The combination of the inductance 56 and the parasitic capacitances of the diode 54 and the FET 58 form a resonant circuit so that the entire circuitry of block 40 forms a high-Q tuned front end to the remaining circuitry shown in FIG. 2. The 3 dB point of the response of this circuit encompasses a very narrow range of frequencies and is much narrower than the bandwidth frequency of the signal to be detected. However, the remaining filtering of circuit 44 reestablishes sufficient signal components to recreate the original signal. The high-Q characteristic of the circuit of block 40 provides an increase of signal gain over a major portion of the signal frequency spectrum of interest, thus reducing the relative amplitude of noise generated in the FET 58 or the following amplification stage 42. In addition, the absence of a resistor 24 (illustrated in the prior art circuit of FIG. 1), eliminates the thermal noise associated with such a component. The waveform of the signal response, shown as that passing from 40 to 42, would have no decay if the circuit of FIG. 40 had an infinite Q. Due to the realities of life, there will be some decay. However, some decay is normally desirable for purposes of adequately distinguishing between input pulses. This decay is shown in a somewhat more exaggerated form in FIG. 2 for illustrative purposes. The filter used to provide a practical circuit was a two path network and with one of the zeros centered at the center frequency of the high-Q tuned front end of circuit 40, a triangular waveform is established at the output of block 44. According to matched filter theory, such an output waveform spectrum is the optimum recreation of the original high frequency pulse while minimizing the extraneous signal products that accompanied the original pulse in the form of the optical signal 52. The spectral density of noise generated within the receiver circuitry subsequent to the diode detector 54 might be insignificant in comparison with noise accompanying the optical detector current signal. However, low-pass filter 48 can be designed to limit this noise in addition to rejecting RF frequency components from the output baseband signal, if necessary. Alternatively, filter 44 may be modified to perform this function in addition to having a zero to cancel the pole of the high-Q tuned circuit of block 40. As long as the detection in decision circuit 50 occurs at a point substantially equivalent to the peak of the triangle shown at the output of block 44, the detection of bursts of pulses adjacent to one another can be appropriately performed.

Although the specific embodiment illustrated is for the detection of either frequency shift keyed (FSK) or amplitude shift keyed (ASK) signals, and thus the circuit only needs to detect one of the two frequencies involved to provide sufficient information to remaining circuitry, the concept of the invention is much broader. The concept is directed toward the elimination of noise from any high frequency signal burst through the use of a high-Q circuit and a suitable filter where the signal source has a high impedance. Although capacitance may be inserted in the high impedance circuit to perform the resonant circuit required as part of the high-Q portion, the approach is most cost effective where there is parasitic capacitance that must be dealt with.

The present inventive concept is equally applicable to situations where there are parasitic inductances in a circuit and where capacitance needs to be added to form a high-Q circuit to be later followed by a suitable filter for recovering the original signal. Also, although the disclosure has shown that the high-Q circuit be a parallel A.T.P. type high-Q circuit, the circuitry can use either serial or parallel connections for the high-Q filter section.

It should be further realized that the terms capacitor and inductors, as used throughout, include the more general terms of capacitance and inductance since items, such as transmission lines, are not truly inductors but merely exhibit inductive characteristics. Similarly, while a diode is not truly a capacitor, it does exhibit capacitive characteristics.

Although I have shown a specific embodiment of the inventive concept, I wish to be limited not by the embodiment shown, but only by the scope of the appended claims, wherein I claim:

1. The method of compensating for parasitic capacitance in an optical signal detector circuit while providing noise signal reduction, comprising the steps of:
   electrically coupling inductance means with a photo diode in the detector circuit to form a high-Q, single pole response filter circuit centered at a given signal frequency which filter has a 3 db bandwidth no greater than ½ the bandwidth of the signal being detected for outputting first signals; and
   further filtering said first signals in a two path network to generate second signals having a matched filter response characteristic centered at said given signal frequency.

2. Optical signal detection apparatus for detecting signals of a given frequency comprising, in combination:
   photo diode optical signal detection means where said detection means includes parasitic capacitive effects;
   inductive means electrically coupled with said photo diode optical signal detection means whereby first electrical signals, output by the combination of said detection means and said inductive means, have a frequency response approximating signals passed by a single pole, high-Q filter circuit; and filtering means, connected to said inductive means, for receiving said first signals therefrom and modifying same to provide as an output signal one having a matched filter frequency response characteristic.

3. The method of compensating for unwanted capacitance in an optical photo diode used in detecting lightwave signals and for reducing signal to noise ratios normally associated with such detection comprising the steps of:

adding compensating inductance in a diode based optical detector circuit to form the equivalent of a high-Q, single pole response filter circuit centered at a given frequency;

amplifying signals passed by the detector circuit; and filtering the amplified signals in a manner representative of a filter exhibiting multiple zeros of transmission wherein one of the zeros occurs at the given frequency; and the compensating inductance acting to increase the signal amplitude and the overall filtering acting to minimize noise signals associated with the lightwave signals.

4. Apparatus for compensating for parasitic capacitance in a high impedance signal source circuit while providing noise signal reduction comprising, in combination:

high impedance signal source first means for operating upon input signals containing substantial percentages of white noise as compared to the signal amplitude where the signal comprises high frequency carrier bursts of a given frequency where the bursts have a rectangular waveform;

inductance second means electrically connected in said signal source first means to form a high-Q, single pole response filter circuit centered at said given frequency for outputting first signals representative of those input signals; and third means for filtering said first signals in a manner appropriate to generate second signals which correspond to signals which have a matched filter response characteristic centered at said given frequency.

5. Apparatus for compensating for parasitic capacitance in an optical signal detector circuit comprising, in combination:

high impedance signal source first means for operating upon input signals containing substantial percentages of white noise as compared to the signal amplitude where the signal comprises high frequency carrier bursts of a given frequency where the bursts have a rectangular waveform;

inductance second means electrically connected in said signal source first means to form a high-Q, single pole response filter circuit centered at said given frequency for outputting first signals representative of those input signals; and multiple zeros of transmission filter third means for filtering said first signals whereby second signals output by said third means correspond to a matched filter response of said input signals.

6. Noise and parasitic capacitance effect reduction circuit apparatus for use in a circuit operating upon bursts of at least radio frequency input signals wherein the bursts have a substantially rectangular waveform comprising, in combination:

first filter means including inductive means for cooperating with the parasitic capacitance of the circuit to filter the input signals passing through to form first signals having a signal frequency response which has a 3 dB bandwidth which is much narrower than the bandwidth of the signal input to said first filter means, said first filter means outputting said first signals; and multiple zeros of transmission filter second means, connected to said first filter means and receiving said first signals therefrom, for outputting second signals which second signals correspond to a matched filter response of said input signals.

7. Apparatus for use in a circuit operating upon bursts of at least radio frequency input signals wherein the bursts have a substantially rectangular waveform comprising, in combination:

first high-Q filter means including inductive means and capacitance means to filter the input signals passing through to form first signals having a signal frequency response which has a 3 dB bandwidth which is much narrower than the bandwidth of the signal input to said first filter means, said first filter means having a transmission pole and said first filter means outputting said first signals; and transmission zero filter second means, connected to said first filter means and receiving said first signals therefrom, said second filter means having a transmission zero adjusted to substantially match the transmission pole of said first filter means whereby signal distortion introduced by said first filter is corrected for outputting second signals which second signals have a correspondence to those signals originally input to said first filter means.

* * * * *